US011378480B2

(12) United States Patent
Broden et al.

(10) Patent No.: US 11,378,480 B2
(45) Date of Patent: Jul. 5, 2022

(54) POLYSILICON ON SAPPHIRE OIL-LESS PRESSURE SENSOR

(71) Applicant: Rosemount Inc., Shakopee, MN (US)

(72) Inventors: David Andrew Broden, Andover, MN (US); Charles Ray Willcox, Hopkins, MN (US)

(73) Assignee: ROSEMOUNT INC., Shakopee, MN (US)

(*) Notice: Subject to any disclaimer, the term of this patent is extended or adjusted under 35 U.S.C. 154(b) by 0 days.

(21) Appl. No.: 17/026,831

(22) Filed: Sep. 21, 2020

(65) Prior Publication Data

US 2022/0090977 A1 Mar. 24, 2022

(51) Int. Cl.
*G01L 19/00* (2006.01)
*G01L 19/14* (2006.01)

(52) U.S. Cl.
CPC ........ *G01L 19/147* (2013.01); *G01L 19/0084* (2013.01)

(58) Field of Classification Search
None
See application file for complete search history.

(56) References Cited

U.S. PATENT DOCUMENTS

| 4,994,781 | A | * | 2/1991 | Sahagen | G01L 9/0055 338/2 |
| 5,088,329 | A | * | 2/1992 | Sahagen | G01L 9/0055 338/4 |
| 5,712,428 | A | * | 1/1998 | Schleiferbock | G01L 9/0075 73/708 |

(Continued)

FOREIGN PATENT DOCUMENTS

| DE | 44 16 978 | 11/1995 |
| DE | 10 2006 035 230 | 1/2008 |

(Continued)

OTHER PUBLICATIONS

"Technical Information Cerabar M PMC51, PMP51, PMP55", Endress+Hauser, downloaded Mar. 2021.

(Continued)

*Primary Examiner* — Lisa M Caputo
*Assistant Examiner* — Nigel H Plumb
(74) *Attorney, Agent, or Firm* — Westman, Champlin & Koehler, P.A.

(57) ABSTRACT

A pressure sensor assembly includes a pressure sensor having a support structure and a sapphire isolation member coupled to the support structure and forming a region between a first surface of the sapphire isolation member and the support structure. A second surface of the sapphire isolation member has a sapphire etch surface formed thereon and is positioned to interface with fluid from or coupled to a process. A process seal is positioned against the second surface of the sapphire isolation member to prevent fluid from passing by the pressure sensor assembly. Electrical leads couple to a polysilicon strain gauge pattern positioned in the region on the first surface of the sapphire isolation member, and the polysilicon strain gauge pattern is configured to generate electrical signals indicative of the pressure of the fluid when the sapphire isolation member deflects responsive to the pressure.

14 Claims, 4 Drawing Sheets

(56) References Cited

U.S. PATENT DOCUMENTS

| | | | |
|---|---|---|---|
| 8,033,179 B2* | 10/2011 | Lopatin | G01L 23/18 |
| | | | 73/756 |
| 8,794,077 B2* | 8/2014 | Philipps | G01L 9/0042 |
| | | | 73/754 |
| 9,625,335 B2* | 4/2017 | Berlinger | G01L 9/00 |
| 10,345,180 B2* | 7/2019 | Becher | G01L 9/0075 |
| 2008/0066555 A1* | 3/2008 | Rezgui | G01L 19/0618 |
| | | | 73/716 |
| 2009/0301210 A1* | 12/2009 | Becher | G01L 9/0044 |
| | | | 73/715 |

FOREIGN PATENT DOCUMENTS

| | | |
|---|---|---|
| EP | 0 336 437 | 11/1989 |
| GB | 2 441 785 | 3/2008 |
| WO | WO 91/17418 | 11/1991 |

OTHER PUBLICATIONS

Notification of Transmittal of the International Search Report and Written Opinion of the International Searching Authority for PCT/US2021/033551, dated Sep. 2, 2021.

* cited by examiner

POLYSILICON ON SAPPHIRE OIL-LESS PRESSURE SENSOR

BACKGROUND

Embodiments of the present disclosure relate to industrial process transmitters and, more specifically, to pressure sensor assemblies for use in such transmitters.

Industrial process field devices, such as process transmitters, are used in industrial process control and monitoring systems to monitor industrial process variables and communicate measured values of the process variable back to a control room in a chemical, petroleum, gas, pharmaceutical, or another fluid processing plant, for example. The term "process variable" refers to a physical or chemical state of matter or conversion of energy. Examples of process variables include pressure, temperature, flow, conductivity, pH, and other properties.

Pressure transmitters, and other pressure sensing field devices or instruments, include a pressure sensor that senses a pressure, such as the pressure of a process fluid. The pressure sensor provides an electrical output that indicates the sensed pressure. The sensed pressure may be processed by circuitry of the pressure transmitter and/or communicated to an external control unit.

Some pressure transmitters rely on thin (0.001-0.002") metal diaphragms to isolate the process fluids from the pressure sensor, with a factory installed fill fluid transmitting the pressure signal from the process to the electronic pressure sensor. These systems may not be well suited to applications where processes are abrasive, or where processes (e.g., hygienic processes) cannot risk the potential contamination of the process in the event of the isolating diaphragm failing. These filled systems also run the risk of diffused gas and/or vacuum impacting the fluid integrity.

Some pressure transmitters address these issues with "oil free" (fill fluid free) designs which incorporate alumina ceramic isolation with integrated capacitive sensing. These products use alumina ceramic as the process isolating diaphragm and form part of an integrated capacitance sensor. While providing an "oil free" feature, these pressure transmitters can have shortcomings, including reduced accuracy, rangeability, stability and overpressure capability when compared to similar metal isolated, fluid filled devices. Some of these limitations are inherent in the alumina material that is both the isolating element and the pressure sensor deflecting element in the sensor system. Further, the isolating/sensor ceramic has a granular nature that is prone to impact/crack propagation failure. Also, when configured for gauge measurements, ambient atmospheric air enters the capacitance detection cavity in some of these types of pressure transmitters, which can lead to performance issues as the "air" dielectric can be humid/condensing and/or otherwise contaminated, creating measurement errors.

SUMMARY

Embodiments of the present disclosure generally relate to pressure sensor assemblies and methods of producing the pressure sensor assemblies. One embodiment of a pressure sensor assembly includes a header forming a cavity, with the header providing a fluid pathway to the cavity. A pressure sensor is positioned in the cavity and configured to sense a pressure of a fluid within the fluid pathway. The pressure sensor includes a support structure and a sapphire isolation member bonded or coupled to the support structure to form a region between a first surface of the sapphire isolation member and the support structure. In an exemplary embodiment, the sapphire isolation member is a single crystal sapphire element. Also, in some exemplary embodiments, the support structure is formed of a material having similar expansion characteristics as the sapphire isolation member, such as sapphire or $Al_2O_3$. A second surface of the sapphire isolation member is positioned to interface with fluid within the fluid pathway. Electrical leads can extend through the support structure. A polysilicon strain gauge pattern is positioned in the region on the first surface of the sapphire isolation member and is coupled to the electrical leads. The polysilicon strain gauge pattern, which can be formed as a Wheatstone bridge, is configured to generate electrical signals indicative of the pressure of the fluid within the fluid pathway when the sapphire isolation member deflects responsive to the pressure.

In exemplary embodiments, the region formed between the first surface of the sapphire isolation member and the support structure contains a reference pressure. The reference pressure can be a vacuum pressure. In other embodiments, the pressure sensor is configured as a gauge pressure sensor and includes a reference vent through the support structure to connect the region formed between the first surface of the sapphire isolation member and the support structure to atmospheric pressure.

In some exemplary embodiments, the pressure sensor assembly includes geometric projections coupled to or formed with the support structure within the region between the first surface of the sapphire isolation member and the support structure to restrict deflection of the sapphire isolation member during overpressure conditions.

In some exemplary embodiments, the pressure sensor assembly includes a temperature sensor positioned on the second surface of the sapphire isolation member and configured to measure process temperature for compensation of process temperature transients.

In another embodiment, a method of producing a pressure sensor assembly is provided. The method includes forming a polysilicon strain gauge pattern on a first surface of a sapphire isolation member, and bonding the sapphire isolation member to a support structure to form a region between the first surface of the sapphire isolation member and the support structure with the polysilicon strain gauge pattern formed within the region. The pressure sensor is then positioned within a cavity of a header such that a second surface of the sapphire isolation member is positioned to interface with fluid within a fluid pathway through the header.

In another embodiment, a process control measurement system includes a housing and a header positioned within the housing, with the header including a cavity and a fluid pathway to the cavity. A pressure sensor is positioned in the cavity and configured to sense a pressure of process fluid through the fluid pathway. The pressure sensor includes a support structure and a sapphire isolation member, formed of a single crystal sapphire element, coupled to the support structure to form a region between a first surface of the sapphire isolation member and the support structure. A second surface of the sapphire isolation member is positioned to interface with fluid within the fluid pathway such that the sapphire isolation member is deflected by pressure from the fluid within the fluid pathway. Electrical leads extend through the support structure and couple to a polysilicon strain gauge pattern positioned in the region on the first surface of the sapphire isolation member. The polysilicon strain gauge pattern is configured to generate electrical signals indicative of the pressure of the fluid within the fluid pathway when the sapphire isolation member deflects responsive to the pressure. In some embodiments, geometric projections on the support structure within the region restrict deflection of the sapphire isolation member during overpressure conditions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIG. 4-1 is a simplified cross-sectional view of a portion of an alternate pressure sensor assembly, in accordance with embodiments of the present invention, for measuring gauge pressure.

FIG. 4-2 is a view of a portion of the pressure sensor assembly of FIG. 4-1 and illustrating an overpressure protection stop or feature.

DETAILED DESCRIPTION OF ILLUSTRATIVE EMBODIMENTS

Figure 1:
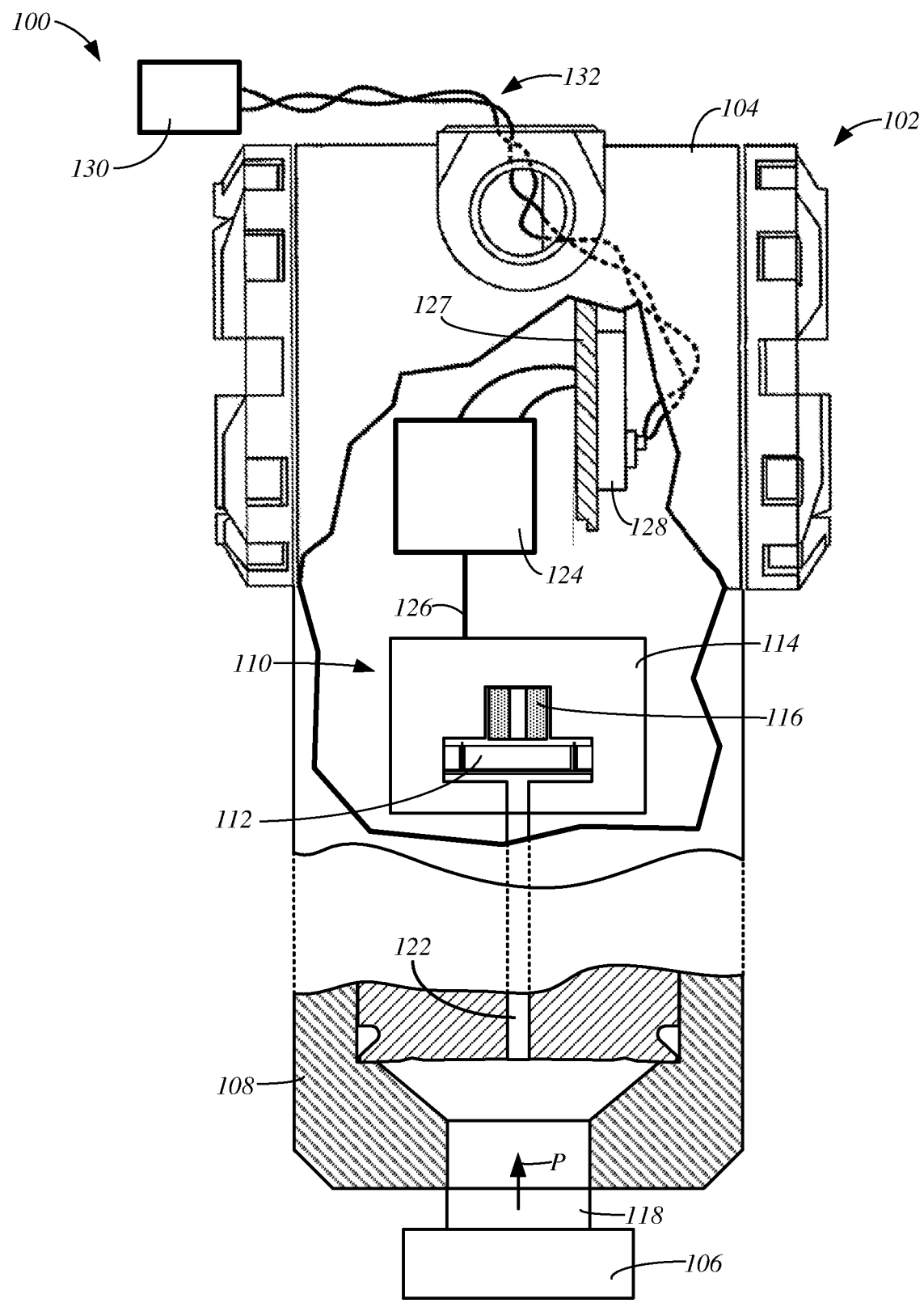
FIG. 1 is a partial cutaway and cross-sectional view of an example of a pressure transmitter in a process control or measurement system, in accordance with embodiments of the present disclosure.

Embodiments of the present disclosure are described more fully hereinafter with reference to the accompanying drawings. Elements that are identified using the same or similar reference characters refer to the same or similar elements. Some elements may not be shown in each of the figures in order to simplify the illustrations.

The various embodiments of the present disclosure may be embodied in many different forms and should not be construed as limited to the specific embodiments set forth herein. Rather, these embodiments are provided so that this disclosure will be thorough and complete, and will fully convey the scope of the present disclosure to those skilled in the art.

Figure 2:
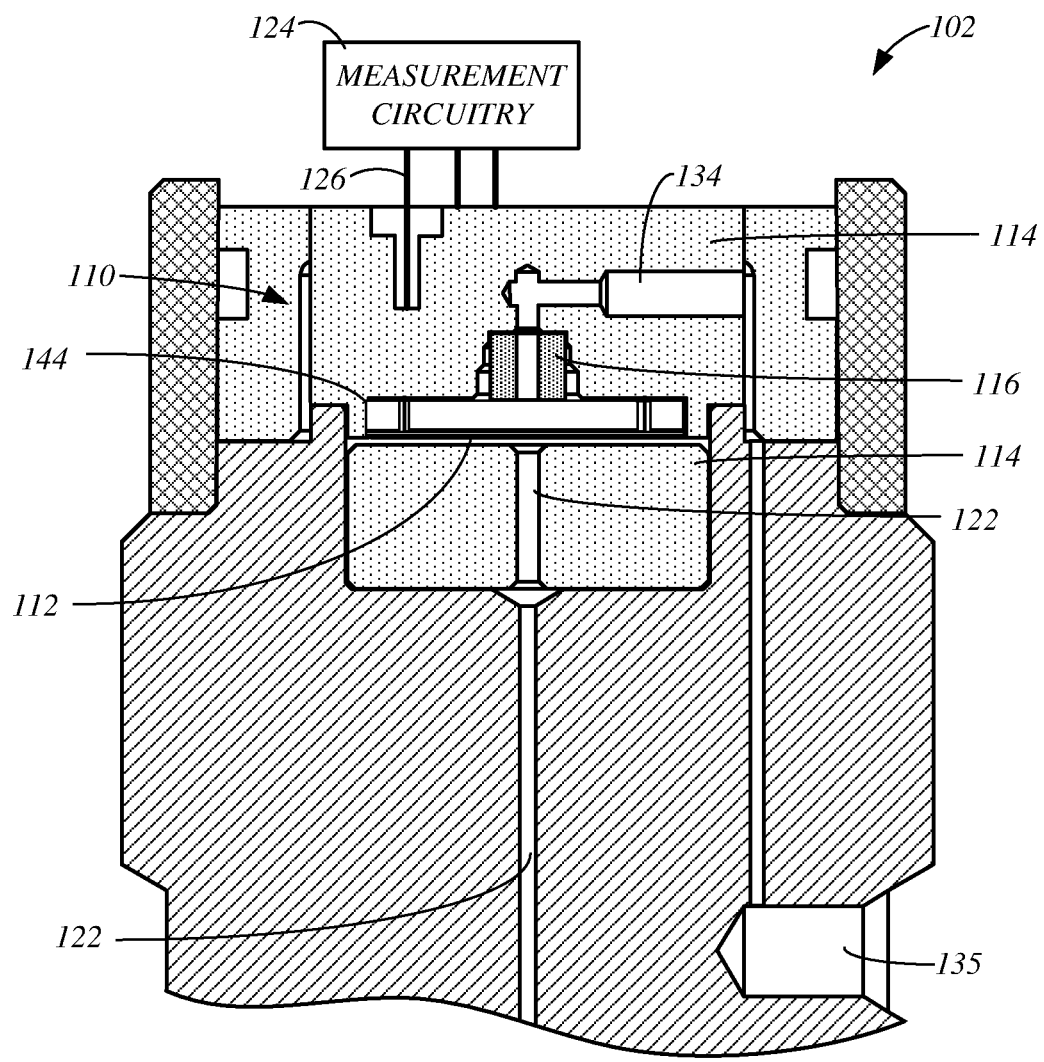
FIG. 2 is a cross-sectional view of a portion of the pressure transmitter of FIG. 1, in accordance with embodiments of the present disclosure.

FIG. 1 is a partial cutaway and cross-sectional view of an example of a process control or measurement system 100 that includes a pressure transmitter 102, in accordance with embodiments of the present disclosure. FIG. 2 is a cross-sectional view of a portion of the transmitter 102 of FIG. 1. The system 100 may be used in the processing of a material (e.g., process medium) to transform the material from a less valuable state into more valuable and useful products, such as petroleum, chemicals, paper, food, etc. For example, the system 100 may be used in facilities that perform hygienic or other types of industrial processes.

The pressure transmitter 102 may include a housing 104 that may be coupled to an industrial process 106 through a process coupling 108. The housing 104 and the process coupling 108 may be formed of stainless steel or another suitable material. The transmitter 102 includes a pressure sensor assembly 110 that is attached to and/or contained within the housing 104. The assembly 110 includes a pressure sensor or pressure sensor die 112 (hereinafter "pressure sensor") formed in accordance with one or more embodiments described herein for measuring a pressure of the process. The pressure sensor assembly 110 may include a header 114 and a pedestal 116 that connects the pressure sensor 112 to the header 114, as best shown in FIG. 2.

The process coupling 108 may be connected to a pipe 118 that is connected to the process 106 and contains a process material (e.g., a fluid) at a pressure P that is to be measured by the pressure sensor 112. The pressure P is communicated to the pressure sensor 112 through fluid pathway 122 that extends through pressure transmitter components, including in some embodiments the process coupling and header 114, to a cavity 144 containing the pressure sensor. The pressure sensor 112, embodiments of which are discussed in further detail with reference to FIGS. 3, 4-1 and 4-2, includes a sensor element having an electrical parameter that is indicative of the applied pressure P. Measurement circuitry 124 may detect and process the electrical parameter of the sensor element through a suitable electrical connection 126 to establish a value for the sensed pressure P. The measurement circuitry 124 may be connected to a terminal block 127 of the transmitter 102 having communications circuitry 128 for communicating information relating to the sensed pressure P, such as a value of the pressure P, to an external computerized control unit 130 through a process control loop 132, as indicated in FIG. 1.

The pressure transmitter 102 may include a path for connecting the sensor 112 to ambient pressure or air, such as through a vent 135 in the housing 104, as shown in FIG. 2. The path may extend through the pedestal 116.

In some embodiments, the process control loop 132 includes a physical communication link, such as a two-wire control loop, as shown in FIG. 1, and/or a wireless communication link. Communications between the control unit 130, or another external computing device, and the pressure transmitter 102 may be performed over the control loop 132 in accordance with conventional analog and/or digital communication protocols. In some embodiments, the two-wire control loop 132 includes a 4-20 milliamp control loop, in which the measured pressure value may be represented by a level of a loop current flowing through the two-wire control loop 132. Exemplary digital communication protocols include the modulation of digital signals onto the analog current level of the two-wire control loop 132, such as in accordance with the HART® communication standard. Other purely digital techniques may also be employed including FieldBus and Profibus communication protocols.

Exemplary wireless versions of the process control loop 132 include, for example, a wireless mesh network protocol, such as WirelessHART® (IEC 62591) or ISA 100.11a (IEC 62734), or another wireless communication protocol, such as WiFi, LoRa, Sigfox, BLE, or any other suitable protocol.

Power may be supplied to the pressure transmitter 102 from any suitable power source. For example, the pressure transmitter 102 may be wholly powered by the current flowing through the control loop 132. One or more power supplies may also be utilized to power the pressure transmitter 102, such as an internal or an external battery. An electrical power generator (e.g., solar panel, a wind power generator, etc.) may also be used to power the pressure transmitter, or charge a power supply used by the pressure transmitter 102.

Figure 3:
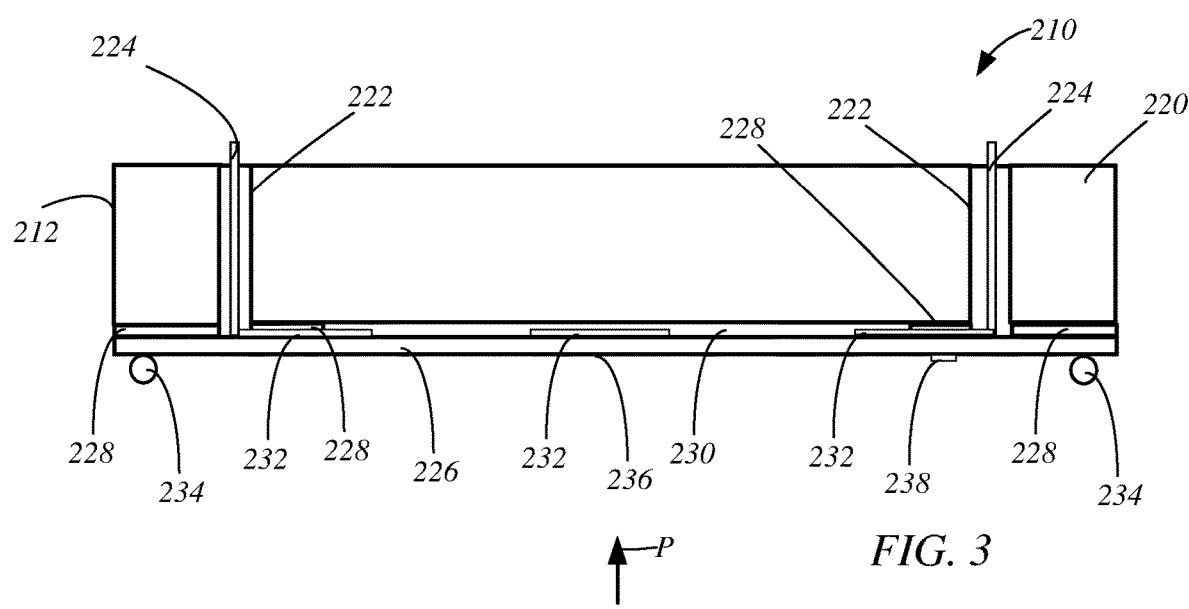
FIG. 3 is a simplified cross-sectional view of a portion of a pressure sensor assembly, in accordance with embodiments of the present disclosure, for measuring absolute pressure.

Referring now to FIG. 3, shown is a pressure sensor assembly 210 having a pressure sensor 212. Assembly 210 and pressure sensor 212 are first exemplary embodiments of pressure sensor assembly 110 and pressure sensor 112 discussed above. Pressure sensor 212 includes a support structure 220 which can be formed for example of sapphire or Al$_2$O$_3$ in exemplary embodiments. Signal lead pathways 222 are provided through support structure to route signal leads 224 to electrical connection 126 and to establish in measurement circuitry 124 a value for the sensed pressure P. A sapphire isolation member 226, which is configured to deflect in response to pressure P of the process material, is attached or coupled to the support structure 220 through hermetic bond material 228. The sapphire isolation member 226, hermetic bond 228, and support structure 220 form a vacuum reference region 230 within the pressure sensor 212 to provide for an absolute pressure measurement. Formed on sapphire isolation member 226, within region 230, is a polysilicon layer strain gauge pattern 232 coupled to signal leads 224 to produce the electrical signals on the leads in response to deflection of sapphire isolation member 226. The polysilicon resistance layer pattern can be formed as a Wheatstone bridge in some embodiments. Also shown is a process seal 234 of the pressure sensor assembly 210 which can be included to provide a seal between a transmitter surface and the sapphire isolation member 226 to prevent process fluid from passing by the sensor assembly. In some embodiments, a sapphire etch surface 236 can be formed on the sapphire isolation member 226, but this is not required in all embodiments.

Figures 1, 4:
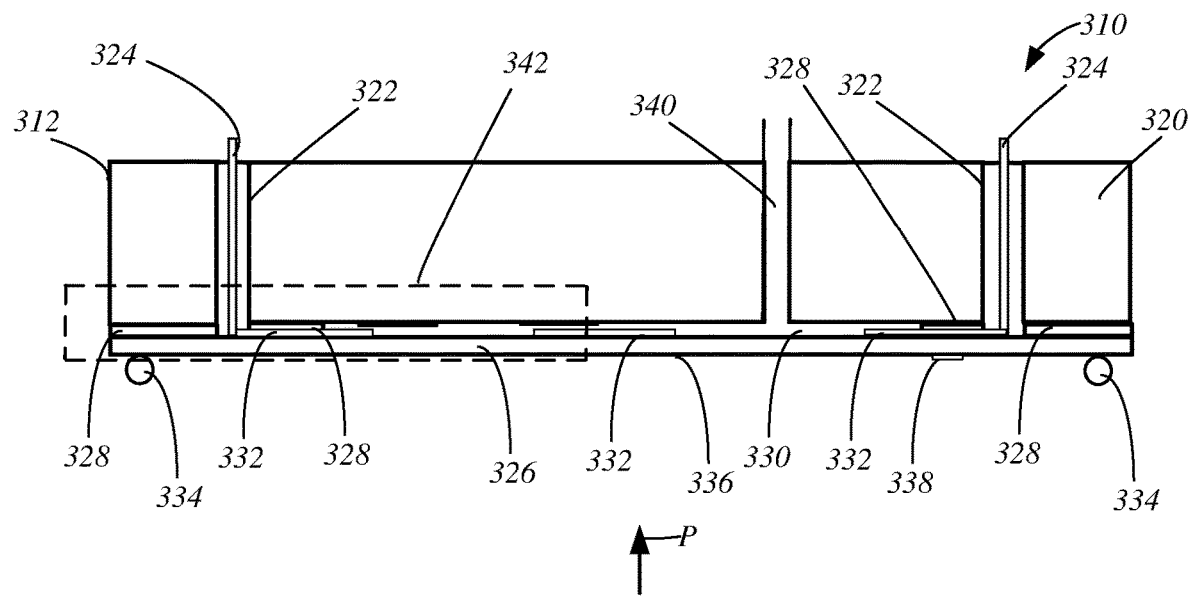
Figures 2, 4:
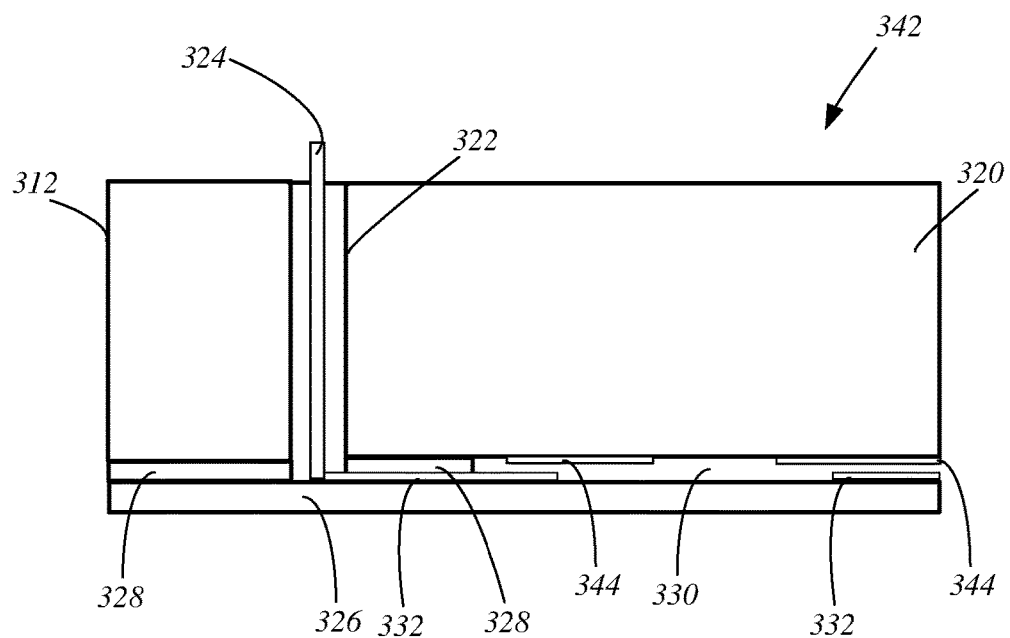

Referring now to FIG. 4-1, shown is a gauge pressure (GP) sensor assembly 310 which is a version of pressure sensor assembly 210 shown in FIG. 3. Pressure sensor assembly 310 has a pressure sensor 312, which is a second exemplary embodiment of pressure sensor 112 discussed above. Pressure sensor 312 has features which are the same or similar to those of pressure sensor 212, including a support structure 320 which can be for example formed of sapphire or Al$_2$O$_3$, with signal lead pathways 322 provided through the support structure to route signal leads 324 to electrical connection 126 and to establish in measurement circuitry 124 a value for the sensed pressure P. A sapphire isolation member 326 is attached or coupled to the support structure 320 through hermetic bond material 328. The sapphire isolation member 326, hermetic bond 328, and support structure 320 form a region 330 within the pressure sensor 312. In the embodiment of pressure sensor 312, a reference vent 340 is provided, connecting region 330 to atmospheric pressure. Formed on sapphire isolation member 326, within region 330, is a polysilicon layer strain gauge pattern 332 coupled to signal leads 324 to produce the electrical signals on the leads in response to deflection of sapphire isolation member 326. Also shown is a process seal 334 of the pressure sensor assembly 310 which can be included to provide a seal between a transmitter surface and the sapphire isolation member 326 to prevent process fluid from passing by the sensor assembly. In some embodiments, a sapphire etch surface 336 can be formed on the sapphire isolation member 326, but again this is not required in all embodiments.

FIG. 4-2 illustrates a portion 342 of pressure sensor assembly 310 in greater detail. As shown in FIG. 4-2, overpressure protection features 344 can be included within region 330 to limit deflection of isolation member 326 during severe overpressure conditions. By acting as a stop to limit the deflection of isolation member 326, stress on the isolation member or diaphragm is also limited to prevent damage and wear on the pressure sensor 312.

When the sapphire isolators 226/326 are deflected with pressure, the polysilicon strain gage pattern 232/332 (as well as a temperature sensing resistor 238/338) located on the back of the isolator detects that deflection. The advantage of polysilicon, and the associated isolation film layers, is that a signal level as high as 18 mv/v can be achieved, as compared to approx. 2 mv/v for a nichrome layer. Thus, the high signal enables higher accuracy, range down and stability performance. The signal is also compatible with existing strain gage signal processing and transmitter electronics. The use of resistance elements (and protective layers) reduces the sensitivity of the detecting circuit to the atmospheric reference used in the GP sensor version (discussed below and shown in FIGS. 4-1 and 4-2), when compared to a capacitance structure.

The strength of the sapphire and high signal level of a polysilicon resistance Wheatstone bridge, will allow higher level protection against overpressure. This robustness can be further enhanced by employing deflection stops in the assembly, such as overpressure protection features 344. While overprotection stops are shown only with reference to pressure sensor assembly 310, it must be understood that such stops can be included with pressure sensor assembly 210 as well. The features of the disclosed pressure sensors, including the sapphire isolation members 226/326 and the overpressure protection features 344 can allow disclosed pressure transmitters to work at five times the maximum working pressure (MWP) or higher, while conventional "oil-less" designs are frequently limited to 1.5 times the MWP.

Fabrication of the sapphire and resistance and isolating films, as well as the backing structure in some embodiments, can be processed at the wafer level to accommodate proven, uniform batch processing. Further, new advances in laser cutting sapphire allow the assemblies to be "diced" to the final round form without damage. An estimated sensor diameter of between 0.5 to 1.0 inches allows a small form factor and low cost.

Although the embodiments of the present disclosure have been described with reference to preferred embodiments, workers skilled in the art will recognize that changes may be made in form and detail without departing from the spirit and scope of the present disclosure. Embodiments of the present disclosure include combinations of one or more of the embodiments described herein.

What is claimed is:

1. A pressure sensor assembly comprising:
 a header forming a cavity, the pressure sensor assembly including a fluid pathway to the cavity;
 a pressure sensor positioned in the cavity and configured to sense a pressure of a fluid within the fluid pathway, the pressure sensor including:
  a support structure;
  a sapphire isolation member coupled to the support structure and forming a region between a first surface of the sapphire isolation member and the support structure, a second surface of the sapphire isolation member, having a sapphire etch surface formed thereon, positioned to interface with fluid within the fluid pathway;
  a process seal positioned against the second surface of the sapphire isolation member to prevent fluid from passing by the pressure sensor assembly;
  electrical leads; and
  a polysilicon strain gauge pattern positioned in the region on the first surface of the sapphire isolation member and coupled to the electrical leads, wherein the polysilicon strain gauge pattern is configured to generate electrical signals indicative of the pressure of the fluid within the fluid pathway when the sapphire isolation member deflects responsive to the pressure.

2. The pressure sensor assembly of claim 1, wherein the sapphire isolation member is a single crystal sapphire element.

3. The pressure sensor assembly of claim 1, wherein the region formed between the first surface of the sapphire isolation member and the support structure contains a reference pressure.

4. The pressure sensor assembly of claim 1, wherein the reference pressure is a vacuum pressure in the region formed between the first surface of the sapphire isolation member and the support structure.

5. The pressure sensor assembly of claim 1, wherein the pressure sensor is configured as a gauge pressure sensor and includes a reference vent through the support structure to connect the region formed between the first surface of the sapphire isolation member and the support structure to atmospheric pressure.

6. The pressure sensor assembly of claim 1, wherein the sapphire isolation member is bonded to the support structure using a bond material.

7. The pressure sensor assembly of claim 1, and further comprising geometric projections coupled to the support structure within the region formed between the first surface of the sapphire isolation member and the support structure to restrict deflection of the sapphire isolation member during overpressure conditions.

8. The pressure sensor assembly of claim 1, and further comprising a temperature sensor positioned on the second surface of the sapphire isolation member and configured to measure process temperature for compensation of process temperature transients.

9. The pressure sensor assembly of claim 1, wherein the polysilicon strain gauge pattern is configured as a Wheatstone bridge.

10. The pressure sensor assembly of claim 1, wherein the support structure comprises sapphire or $Al_2O_3$.

11. A process control measurement system comprising:
a housing;
a header positioned within the housing, the header including a cavity and including a fluid pathway to the cavity;
a pressure sensor positioned in the cavity and configured to sense a pressure of process fluid through the fluid pathway, the pressure sensor including:
a support structure;
a sapphire isolation member, formed of a single crystal sapphire element, coupled to the support structure and forming a region between a first surface of the sapphire isolation member and the support structure, a second surface of the sapphire isolation member positioned to interface with fluid within the fluid pathway, the sapphire isolation member configured to be deflected by pressure from the fluid within the fluid pathway;
a process seal positioned against the second surface of the sapphire isolation member to prevent fluid from passing by the pressure sensor;
electrical leads extending through the support structure; and
a polysilicon strain gauge pattern positioned in the region on the first surface of the sapphire isolation member and coupled to the electrical leads, wherein the polysilicon strain gauge pattern is configured to generate electrical signals indicative of the pressure of the fluid within the fluid pathway when the sapphire isolation member deflects responsive to the pressure.

12. The process control measurement system of claim 11, wherein the support structure includes geometric projections on the support structure within the region to restrict deflection of the sapphire isolation member during overpressure conditions.

13. The process control measurement system of claim 12, and further comprising a reference vent through the support structure and connecting the region to atmospheric pressure.

14. The process control measurement system of claim 11, wherein the second surface of the sapphire isolation member has a sapphire etch surface formed thereon.

* * * * *